United States Patent Office 3,644,349
Patented Feb. 22, 1972

3,644,349
NOVEL VITAMIN B$_6$ DERIVATIVE AND THE PREPARATION THEREOF
Kentaro Okumura and Ichizo Inoue, Hyogo-ken, Tatsuo Oda, Osaka-shi, and Kazuhiko Kondo, Higashi-Osaka-shi, Japan, assignors to Tanabe Seiyaku Co., Ltd., Osaka, Japan
No Drawing. Filed July 10, 1969, Ser. No. 840,849
Claims priority, application Japan, July 19, 1968, 43/51,043
Int. Cl. C07d 93/06
U.S. Cl. 260—243 R                                4 Claims

ABSTRACT OF THE DISCLOSURE

N-[2-(3-hydroxy - 5 - hydroxymethyl - 2 - methyl-4-pyridyl) - tetrahydro-1,3-thiazine-4-carbonyl]glycine and its pharmaceutically acceptable acid addition salts. These compounds are readily absorbed and afford prolonged pyridoxal levels in the body. Pyridoxal free base or an acid addition salt of pyridoxal is reacted with homocysteinylglycine. Alternatively, a betaine or an alkali metal salt of (2-methyl-3-hydroxy-5-hydroxymethyl - 4 - pyridyl)-hydroxymethane-sulfonic acid is reacted with homocysteinylglycine.

---

This invention relates to a novel vitamin B$_6$ derivative and to the preparation of same. More particularly, it relates to N-[2-(3-hydroxy - 5 - hydroxymethyl-2-methyl-4-pyridyl)-tetrahydro-1,3-thiazine-4-carbonyl]glycine.

The compound may be represented by the following formula:

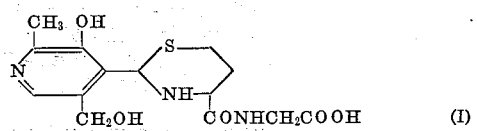

(I)

It is well known that vitamin B$_6$ compounds such as pyridoxine, pyridoxal and pyridoxamine are important for therapy and nutrition. It is also known that vitamin B compounds are disadvantageous in that they are poorly absorbed from the digestive tract and afford insufficient duration in the living body. Various attempts have been made in an effort to overcome said disadvantages of the vitamin B$_6$ compounds and the derivatives of pyridoxal represented by the following Formulas II–IV:

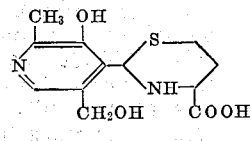

(II)

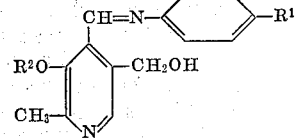

(III)

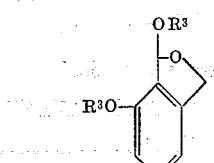

(IV)

wherein R$^1$ represents hydrogen or an alkoxycarbonyl group, R$^2$ represents hydrogen, an aliphatic acyl or benzoyl group, and R$^3$ represents an aliphatic acyl group.

We have now found that compound I of this invention not only has the activity of both vitamin B$_6$ and homocysteine but also affords very high and prolonged pyridoxal levels in the living body as compared with known vitamin B$_6$ derivatives. When compound I of this invention is administered orally, it is readily absorbed from the digestive tract. This results in higher and more prolonged pyridoxal levels in the living body as compared with compounds II–IV or with pyridoxal hydrochloride. This is clearly shown in the following Table I.

An experiment was conducted as follows: The vitamin B$_6$ derivatives tabulated in Table I were orally administered to Wistar-King male rats of 230–250 g. body weight in doses of equimolar amount to 5 mg. of pyridoxal hydrochloride/kg./day. The vitamin B$_6$ level (g./ml.) in the blood was then periodically measured by a microbiological method (using *Sacchromyces carlsbergensis*).

TABLE I

| Vitamin B$_6$ derivatives | 30 min. | 1 hr. | 2 hrs. | 4 hrs. | 6 hrs. |
|---|---|---|---|---|---|
| Compound (I) of the invention | 0.7 | 4.0 | 5.7 | 7.0 | 0.7 |
| Compound (II) | 0.9 | 5.9 | 3.7 | 1.8 | 0.6 |
| Compound (III) (R$^1$=C$_2$H$_5$COO—, (R$^2$=CH$_3$CO—) | 3.2 | 1.7 | 1.4 | 1.3 | 1.4 |
| Compound (IV) (R$^3$=CH$_3$CO—) | 5.5 | 7.4 | 2.2 | 2.0 | 1.3 |
| Pyridoxal hydrochloride | 3.4 | 6.3 | 2.4 | 1.7 | 1.4 |

The vitamin B$_6$ activity of compound I is tabulated in the following Table II. In Table II the lethal ratio of rats was examined over a period of time. 30 mg./kg. of thiosemicarbazide was administered to rats subcutaneously. Concomitantly an amount of compound I equivalent to 5 mg./kg. of pyridoxine hydrochloride was administered orally. dd-K male rats of 16–18 g. body weight were employed.

TABLE II

| Vitamin B$_6$ derivative | 30 min. | 1 hr. | 1.5 hrs. | 2 hrs. | 2.5 hrs. | 3 hrs. | 6 hrs. | 24 hrs. |
|---|---|---|---|---|---|---|---|---|
| Compound (I) of the invention | 0/8 | 0/8 | 0/8 | 1/8 | 1/8 | 1/8 | 1/8 | 1/8 |
| Pyridoxine hydrochloride | 0/8 | 0/8 | 5/8 | 6/8 | 6/8 | 6/8 | 6/8 | 6/8 |
| Control | 0/10 | 2/10 | 6/10 | 9/10 | 10/10 | | | |

It is clear that compound I of this invention is much more effective than pyridoxine hydrochloride in preventing thiosemicarbazide-convulsive death. Moreover, the LD$_{50}$ of the compound I of this invention is remarkably lower than that of pyridoxine hydrochloride and pyridoxine phosphate. We have observed acute toxic symptoms such as hyperventilation, clonus and sensitivity to sounds upon the subcutaneous administration of pyridoxine hydrochloride or pyridoxal phosphate. In contrast, the aforementioned symptoms were substantially diminished in cases wherein compound I was orally and subcutaneously administered.

It is obvious from the foregoing facts that the compound I of this invention is more useful than vitamin B$_6$ derivatives heretofore known for the treatment of vitamin B$_6$ deficiency symptoms. This is particularly true when said compound I is orally administered.

Compound I of this invention is also useful, due to the synergetic activity of vitamin B$_6$ and homocysteine, for the prevention and treatment of various dermatitis such as seborrhetic dermatitis and acne symptoms of INH (isonicotinic acid hydrazine) eruption.

According to the present invention, the method for preparing compound I is represented by the following equation:

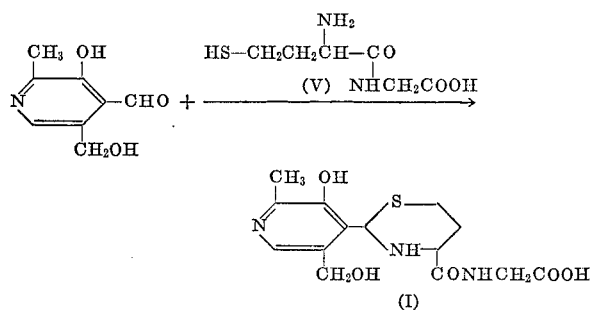

The condensation reaction can be conveniently carried out by mixing pyridoxal and homocysteinyl-glycine in a suitable solvent. This mixture is then permitted to stand for a few hours at room temperature. Alternatively, the reaction may be carried out by heating the mixture for from three to twenty minutes. Water, methanol, ethanol, etc. may be used as the reaction solvent. Pyridoxal in the above reaction may be replaced with an acid addition salt of pyridoxal or with (3-hydroxy-5-hydroxy-methyl-2-methyl-4-pyridyl)-hydroxy-methane sulfonic acid in the form of its betaine or its alkali metal salt for example, the sodium salt. A reaction mixture containing pyridoxal, which has been formed by the oxidation of pyridoxic or the reaction of pyridoxal-oxime with nitrous acid, can also be employed as the starting material. The final product I can be recovered from the reaction mixture by a conventional manner, for example, by filtration.

The method for preparing the starting compound V of the present invention is represented by the following equation:

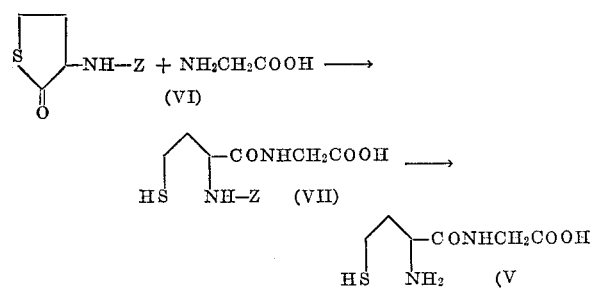

wherein Z represents a carbobenzoxy group. The condensation reaction can be carried out by mixing N-carbobenzoxy-homocysteine thiolactone and glycine in alcoholic alkali-alkoxide. This mixture is heated under nitrogen atmosphere. The resulting product VII is treated with metallic sodium in liquid ammonia to give the compound V by the elimination of the N-carbobenzoxy group.

EXAMPLE 11.7 g. of glycine and 38.9 g. of N-carbobenzoxy-homocysteine thiolactone are added to a solution of 3.6 g. of metallic sodium in 600 ml. of absolute methanol. The mixture so obtained is refluxed for 6 hours under a nitrogen atmosphere. After completion of the reaction, the solution is evaporated under reduced pressure to remove methanol. The resultant residue is dissolved in cool water. Concentrated hydrochloric acid is added to the solution to make it acidic to Congo-Red. The extricating oil is extracted with ethylacetate. The ethylacetate solution is dried and evaporated to remove the solvent. The residue thus obtained is recrystallized from acetone-ligroin. 33.7 g. of N-carbobenzoxy-homocysteinyl-glycine are yielded. This represents a yield of 63%.

*Analysis.*—Calculated for $C_{14}H_{18}O_5N_2S$ (percent): C, 51.52; H, 5.56; N, 8.59; S, 9.82. Found (percent): C, 51.43; H, 5.28; N, 9.17; S. 9.60.

24.5 g. of N-carbobenzoxy-homocysteinyl glycine are dissolved in 700 ml. of liquid ammonia. 4.4 g. of metallic sodium are added to this solution. The solution assumes a blue color due to the presence of sodium. 0.2 g. of ammonium chloride is added to the solution. Then the solution is evaporated under a nitrogen atmosphere to remove ammonia. Cool water is added to the resultant residue. The pH of the solution thus formed is adjusted to pH 5.0 with concentrated hydrochloric acid. 7.1 g. of lead acetate are added to the solution and the resultant crystals are filtered off. 14 g. of crude crystals of lead homocysteinyl-glycinate are obtained. The crystals are suspended in cool water and gaseous hydrogen sulfide is introduced into the solution to eliminate lead ion. The aqueous layer is then dried in a frozen state, for example by freeze drying, to yield 4.8 g. of homocysteinyl-glycine hydrochloride. This represents a yield of 21%. The SH content is 63.8%.

0.62 g. of homocysteinyl-glycine hydrochloride and 0.32 g. of pyridoxal free base are added to 1 ml. of water. This mixture is warmed for 5 minutes at 40° C. on a water bath to produce a clear solution. This solution is permitted to stand overnight in a refrigerator. The resultant crystals are filtered off and dried. 470 mg. of crude crystals decomposing at 164–167° C. are obtained. The crude crystals are recrystallized from 1.5 ml. of water. 140 mg. of N-[2-(3-hydroxy-5-hydroxymethyl - 2 - methyl - 4 - pyridyl)-tetrahydro - 1,3 - thiazine - 4 - carbonyl]glycine hydrochloride having a melting point of 177–179° C. (decomp.) is obtained. This represents a yield of 26%.

*Analysis.*—Calculated for $C_{14}H_{19}O_5N_3SHCl$ (percent): C, 44.51; H, 5.07; N, 11.12. Found (percent): C, 44.38; H, 5.22; N, 11.13.

What is claimed is:

1. A compound selected from the group consisting of N-[2-(3-hydroxy - 5 - hydroxymethyl - 2 - methyl-4-pyridyl)-tetrahydro - 1,3 - thiazine - 4 - carbonyl]glycine and its pharmaceutically acceptable acid addition salts.

2. N-[2-(3-hydroxy - 5 - hydroxymethyl - 2 - methyl-4-pyridyl)-tetrahydro - 1,3 - thiazine - 4 - carbonyl]glycine hydrohalide.

3. A process for preparing a compound selected from the group consisting of N-[2-(3-hydroxy - 5 - hydroxymethyl-2-methyl - 4 - pyridyl)-tetrahydro - 1,3 - thiazine-4-carbonyl]glycine and its pharmaceutically acceptable acid addition salts, which process comprises the steps of reacting N-carbobenzoxy-homocysteine-thiolactone with glycine in alcoholic alkali-alkoxide to form a reaction product, treating the reaction product with metallic sodium in liquid ammonia to produce homocysteinyl-glycine, then reacting the homocysteinyl-glycine with pyridoxal free base or an acid addition salt of pyridoxal.

4. A process for preparing a compound selected from the group consisting of N-[2-(3-hydroxy-5-hydroxymethyl-2-methyl - 4 - pyridyl)-tetrahydro - 1,3 - thiazine -4-carbonyl]glycine and its pharmaceutically acceptable acid addition salts, which process comprises the steps of reacting N-carbobenzoxy-homocysteine-thiolactone with glycine in alcoholic alkali-alkoxide to form a reaction product, treating the reaction product with metallic sodium in liquid ammonia to produce homocysteinyl-glycine, then reacting the homocysteinylglycine with a betaine or alkali metal salt of (2-methyl-3-hydroxy-5-hydroxymethyl-4-pyridyl)-hydroxymethane sulfonic acid.

References Cited

UNITED STATES PATENTS 3,314,951  4/1967  Wolf _____ 260—243
3,386,997  6/1968  Okumura et al. _____ 260—243

JOHN M. FORD, Primary Examiner

U.S. Cl. X.R.

260—534 S, 482 B; 424—246